(12) United States Patent
Bogrash (10) Patent No.: US 11,198,507 B2
(45) Date of Patent: Dec. 14, 2021

(54) CYCLOIDAL ROTOR OR PROPELLER WITH PERFORMANCE AND FLOWS OPTIMIZATION

(71) Applicant: OPTIVECTOR LTD, Raanana (IL)

(72) Inventor: Philip Bogrash, Ashdod (IL)

(73) Assignee: OPTIVECTOR Ltd, Raanana (IL)

( * ) Notice: Subject to any disclaimer, the term of this patent is extended or adjusted under 35 U.S.C. 154(b) by 19 days.

(21) Appl. No.: 16/090,652

(22) PCT Filed: Apr. 3, 2017

(86) PCT No.: PCT/IL2017/050401
§ 371 (c)(1),
(2) Date: Oct. 2, 2018

(87) PCT Pub. No.: WO2017/175217
PCT Pub. Date: Oct. 12, 2017

(65) Prior Publication Data
US 2019/0144110 A1    May 16, 2019

Related U.S. Application Data

(60) Provisional application No. 62/317,588, filed on Apr. 3, 2016, provisional application No. 62/396,512, filed on Sep. 19, 2016.

(51) Int. Cl.
| | | |
|---|---|---|
| *B64C 39/00* | (2006.01) |
| *B64C 11/32* | (2006.01) |
| *B64C 27/59* | (2006.01) |
| *F03D 3/00* | (2006.01) |
| *F03D 3/06* | (2006.01) |

(52) U.S. Cl.
CPC ............ *B64C 39/005* (2013.01); *B64C 11/32* (2013.01); *B64C 27/59* (2013.01); *F03D 3/002* (2013.01); *F03D 3/067* (2013.01)

(58) Field of Classification Search
CPC ....... B64C 39/005; B64C 27/59; B64C 11/32; B64C 2201/088; F03D 3/002; F03D 3/067
See application file for complete search history.

(56) References Cited

U.S. PATENT DOCUMENTS 5,265,827 A * 11/1993 Gerhardt ............... B64C 39/005
    244/20
6,065,935 A *  5/2000 Perfahl ................... B63H 1/10
    416/156

(Continued)

FOREIGN PATENT DOCUMENTS

WO    WO-2009109918 A4 *  5/2010 ............. B64C 11/00

*Primary Examiner* — Michael C Zarroli (57) ABSTRACT

A cycloidal rotor is provided having a flexible by actuators or self-flexing blade-positioning tack, which can be brought into shape corresponding to currently desired blade orbit. This rotor can also be provided with frontal shielding or partial enclosure to assure that rotor operates at any speed as if in hovering flight; rotor track can be inclined to produce forward thrust or external thrusters can be used. Optionally in other embodiments blade orbit shape is determined by a variable cam mechanism or the inclination of blade positioning track of fixed shape to produce a change of its projected shape onto blades' plane of operation thus changing blades elliptic orbit. Blade centrifugal force countervailing mechanism is also proposed.

20 Claims, 8 Drawing Sheets

(56) References Cited

U.S. PATENT DOCUMENTS

| | | | | |
|---|---|---|---|---|
| 8,540,485 B2 * | 9/2013 | Bogrash | ............... | F03D 5/04 416/1 |
| 2001/0036406 A1 * | 11/2001 | Illingworth | .......... | B64C 11/001 416/1 |
| 2004/0187475 A1 * | 9/2004 | Usab, Jr. | ................ | F01D 5/142 60/204 |

* cited by examiner

FIG. 5  $F_{C.V.T}$ — COUNTERVAILING FORCE DUE TO TENSION

FIG. 5a  $F_{C.V.M}$ — COUNTERVAILING FORCE OF MAGNETIC REPULSION

CYCLOIDAL ROTOR OR PROPELLER WITH PERFORMANCE AND FLOWS OPTIMIZATION

RELATIONSHIP TO OTHER APPLICATIONS

This application is related to U.S. Provisional Applications 62/317,588 and 62/396,512 and claims the benefit of filing date of U.S. Provisional Patent Application 62/317,588 filed on Apr. 3, 2016

BACKGROUND OF THE INVENTION

Field of the Invention

This invention relates to a cycloidal rotor or propeller and particularly to a type of cycloidal rotor or propeller that enables the blades to follow various non-circular orbits.

Description of the Prior Art

Presently the potential of aircraft employing cycloidal rotors is increasingly being recognized. Most aircraft have differing requirements in terms of lift and thrust depending on the stage of flight. For VTOL and STOL aircraft in particular it is desirable to have a high lift to thrust ratio for takeoff. Cycloidal rotors have the ability to change the lift to thrust ratio by changing the angle of attack of the blades as they rotate. U.S. Pat. Nos. 5,265,827 and 6,932,296 describe examples of prior art incorporating a circular orbiting cycloidal rotor. U.S. Pat. No. 8,540,485 filed by this author describes cycloidal rotors or propellers with generally non-circular blade orbits.

For prior art cycloidal rotors with a circular blade orbit, the period in each revolution during which a blade can produce the desired aerodynamic effect and the kinds of aerodynamic effects that can be produced, are limited by the circular geometry of the orbit and only two available degrees of movement; rotational around the central axis and rotational blade pitch—this circumstance limits the efficiency of the cycloidal rotors. Furthermore, while I will not be bound by the Computational Fluid Dynamics (hereinafter CFD) study results, said study demonstrated that the circular orbit is by far the worst orbit in terms of Power Loading among the trajectories (mostly elliptic), that were tried for the aerial rotors. The limited efficiency, which is nonetheless generally higher than that of the screw type marine propellers, is also the case for the cycloidal propellers used in the marine applications, which need not produce lift and only provide thrust. For example they, along most of the trajectory, produce large forces' vector components that are perpendicular to the direction of thrust which cancel out, but the engine power is wasted on their generation. For the prior art variable cycloidal rotors with generally non-circular blade orbits in our above referenced patent, the blades have more degrees of movement and will be able to follow the optimized non-circular trajectories, with relative wind, angle of attack and optionally spatial orientation of the blades continuously optimized in combination for the maximum efficiency or the maximum lift or maximum forward speed or the most silent operation. However in the said patent, in the embodiments presented the blades are able to follow the generally non-circular trajectories either by means of the constantly engaged linear actuators continuously operated by the control system for changing the radial distance from the axis of rotation thereby shaping the blade trajectories or by following a fixed non-circular track corresponding to the orbit shape. In these embodiments the continuous operation of linear actuators will be using up their useful service lives requiring regularly scheduled preventive maintenance and replacement of these actuators. Continuous, uninterrupted dependence on the computer control system for all aspects of rotor operation even when the operating regime is unchanged is not desirable, as it increases the chances of rotor malfunction due to either a software glitch, a computer hardware or an actuator malfunction or a disruption due to for example such factors as lightnings' electromagnetic pulses or electronic jamming. Accordingly one embodiment in the above referenced patent where the blades follow a fixed non-circular guidance track while moving radially along the rotor's arm without relying on the computer controlled linear actuators will increase the reliability and simplicity of operation, however as there are different flight regimes and conditions it would be desirable for a rotor to have the ability to use not just one, but a plurality of non-circular track shapes corresponding to different orbital trajectories and to be able to transition from one such track configuration to another and to change the angle of attack regime accordingly depending on the flight regime and conditions. Likewise the above referenced embodiment in the above referenced patent of ours uses a track, upon which the rollers mounted on the blade ride, thereby positioning the blade at the appropriate blade pitch along the orbit. Clearly a plurality of such blade pitch track shapes will be needed, if we have a plurality of trajectory track shapes. Furthermore for each trajectory track shape more than one blade pitch track shape may be needed for different flight regimes. It needs to be noted that for the symmetrical tracks and therefore blade orbits such as elliptic with the even number of blades each blade will be counterbalanced by the opposing blade, but for the non-symmetrical trajectories and/or odd number of blades known counterbalancing means, for example the means which are similar to the means which are described in the U.S. Pat. No. 8,540,485 and/or the patent application WO2014037948A1 can be used to maintain the rotor or propeller balance. Additionally it should be noted that, as the flows about the blade in an operating rotor or propeller are complex and varying very substantially along the orbit, we can reasonably infer that for the orbiting blade for any given instant there is one optimum cross-sectional shape of the blade. If the blade or a pertinent part thereof such as the trailing edge adjacent part, is flexible or there is a turnable trailing edge flap, the flexing of the blade and/or turning of said trailing edge flap can be accomplished by providing the blade with the follower means mounted for riding on at least one dedicated track of a shape corresponding to the desired flexing or turning regime. However for a more complex blade flexing and thus cross-sectional shape variation more than one such track may be required. Naturally for a different RPM, flight regime or conditions the flexing or turning regimes will be different and will therefore require the transitioning to a different track shape of the blade flexing or trailing edge turning controlling track(s). To summarize the above, a dedicated track with more than one possible track shape and with the ability to transition between said shapes, may be required for each of the following tasks; to control the blade orbital trajectory, its pitch change regime, and its cross-sectional shape change regime. For the latter more than one dedicated track may be required. It is to be noted that various combinations of design solutions for the rotor or propeller of the present invention are possible such as for instance the shape varying track for blade trajectory control in combination with the independent for each blade actuator based blade pitch varying and the actuated blade cross-sectional flexing or possibly a fixed elongated blade trajectory positioning track with shape varying tracks for the blade pitch varying and for blade cross-sectional flexing and other such combinations. Additionally it should be noted that the tracks mentioned do not have to be of the variety designed for blades carriages with rollers or wheels; it can be designed for operating using on said carriages the porous or perforated airpads or other known pads utilizing air lubrication. Similar design solutions can be used for the blade carriages operating in the water medium, including forced water flow into the clearance between the pertinent surfaces of the said carriage and the track and/or said carriage aquaplaning along the track surface. Alternatively for aerial rotors these tracks can be implemented as the magnetic levitation tracks with magnets of suitable kinds located on the track and possibly assembled into Hallbach arrays or the track itself suitably magnetized, while the conductive wiring or coils, such as for example made of the extremely lightweight and corrosion free graphene wire, is affixed on each blade at a predetermined location(s) in a predetermined pattern to cause the induction by the magnets' magnetic field of the electric current in them which would produce a magnetic field interacting with the magnetic field emanating from the magnets and producing the levitation effect—which is a known technology. A magnetic levitation track can be made non-continuous comprised of individual or grouped magnetic elements, wherein the magnetic elements can be made pivoted, so as to be able to incline/recline thus turning towards each blade and turn again following it as it passes over them. Said magnetic elements could also be provided with location adjustability to comprise a non-continuous track with shape variability. Furthermore the sequentially activated magnets mounted along said magnetic track could be used for blade propulsion that would have the linear speed that is independently controllable and not dependent on the radial distance from the axis, which is a known technology. Providing a propeller or a rotor with the optimized blade trajectory in combination with the optimized blade pitch regime along the entire orbit and optionally the optimized blade cross-sectional variability regime would clearly result in improvement of the rotor or propeller performance and efficiency compared to the existing circular orbiting cycloidal propellers or rotors, which lack these features and more so compared to the screw-type propellers and rotors which are predominant today. However controlling the flows within a propeller or a rotor and in its vicinity would result in achieving much higher still levels of performance and efficiency. Also, as is well known, cycloidal aerial rotor's operation can be disrupted by the gusts of wind. Furthermore, as demonstrated by the above referenced CFD study by the results of which I will not be bound, cycloidal rotors with horizontally elongated blade trajectory will be especially adversely affected by the horizontal oncoming relative flow which disrupts the complex flow patterns that otherwise would exist inside of such rotor and causes highly unstable and largely chaotic flow patterns inside of such rotor drastically reducing its Power Loading and Lift and being conducive to destabilizing the rotorcraft. In order to prevent the diminishment of Lift and/or rotorcraft destabilization the rotor can by shielded by a fairing or enclosed partially or completely with controllable air intake opening on top and downwash exit opening at the bottom of the enclosure. The flows' control can be accomplished by providing the rotor with the internal and/or external flow directing vanes which may also be provided with the abilities to change their cross-sectional and/or spanwise shape, their dimensions as well as their location and spatial orientation in 2 or 3 dimensions. Where appropriate said vanes can optionally be shaped, depending on their operating medium, respectively as either the airfoils or hydrofoils in order to provide lift or thrust in interaction with the flows about them and or re-direct the flows as needed. In other matters, making the blades cross-sectionally flexible may tend to decrease their stiffness along the span. By providing a countervailing force to the centrifugal force, which usually is the greatest force acting on the aerial cycloidal rotor blade, such as at the blade's mid-span, such decrease in stiffness can be compensated for. Said countervailing force can be provided for example by a string or belt extending, by a predetermined and variable in line with the blade's radial position length, from a miniature (where appropriate) reel on the shaft to the blade or by another track, with blade support carriages moving along it, possibly extending not along the whole perimeter, but only where the centrifugal force is the greatest. Of course said track shape will also need to be changed in line with changes of the blade trajectory track shape and may as well require repositioning to keep the distance as needed between itself and the blade trajectory track. Such a track can be either the one suitable for the mechanical follower means, such as rollers or airpads or aquaplaning pads depending on the operating medium. Or such a track may be of a magnetic levitation variety of the kind described above, which would allow the easiest interaction with the blade, avoiding any mechanical contact with it and any mechanical bumping effect as it enters, traverses and leaves the lengths of said track.

If the fixed shape or flexing tracks, used for varying blade pitch, run alongside the blade trajectory, their length and accordingly weight are likely to be significant. In order to use smaller pitch control tracks operative linkages from such smaller tracks to the blades need to be provided. Since the blades trajectory and therefore distance from said pitch tracks may vary the solution can be provided by converting pitch track shape variability, as encountered by the orbiting follower means, into turning motion of the connecting rods; which turn by means of bevel gears the blades, thus changing their pitch. Such connecting rods can be made telescoping or the bevel gear in mesh with the bevel gear of the blade is placed on a carriage moving along the turnable connecting rod, to accommodate the variability of distance between the blades and said pitch track due to blade trajectory being generally non-circular and variable. The changes in the pitch track shape as encountered by follower means can be converted into turn motion by means of using high pitch threaded ball nut on the connecting rod, so that the radial reciprocal motion of a threaded rod mounted on the follower is converted into the turning motion of the connecting rod. Alternatively designs with rack and pinion coupling converting the radial reciprocal motion of follower rod into turning motion which then by using bevel gears on the connecting rod is used to turn the blade, thus changing its pitch. Another possibility—pitch track changing shape outside of its plane with each follower mounted on an arm installed on the telescoping rod turning said rod, as it follows the pitch track.

SUMMARY OF THE INVENTION

An object of the present invention is to provide a cycloidal rotor with the optimized performance and flows wherein the blades are able to follow a variety of generally non-circular orbits suited for various operating regimes without the continuous operation of the linear actuators and the computer control system controlling these actuators for shaping the blade orbits thereby increasing the rotor's reliability.

Another object of the present invention is to provide a rotor with optimized performance and flows being able to select a non-circular shaped track corresponding to the desired blade orbit from among the available plurality of them based on either a manual pilot/operator input or a control system determination and for blades to follow said track until either a manual pilot/operator input or a control system determination causes the transition of the blades to another such track corresponding to a different non-circular blade orbit suitable for a different operating regime or conditions.

Another object of the present invention is to provide a rotor with optimized performance and flows being able to select a blade pitch track shape corresponding to the desired blade pitch regime from among the available plurality of said track shapes.

Another object of the present invention is to provide said rotor being able to optionally select at least one blade flexing track shape corresponding to the desired blade cross-sectional flexing and/or trailing flap turning regime from among the available plurality of said track shapes.

Another object of the present invention is to provide a rotor with optimized performance and flows within rotor and/or its vicinity by means of providing internal and/or external vanes whose spatial orientation is optionally adjustable and so are their cross-sectional and spanwise shapes as well as their position in 2 or 3 dimensions.

Another object of the present invention is to provide a counteraction to the centrifugal force acting on the blade which would act to prevent its flexing and possible failure.

Another object of the present invention is to provide the shielding or enclosure for the rotor to make it unaffected by the oncoming flow and thus assure its steady operation at various forward speeds.

DESCRIPTION OF THE PREFERRED EMBODIMENTS

We shall describe one type of the rotor/propeller wherein the change in the blade trajectory is accomplished by means of changing the projection of the fixed shape guidance track onto the plane in which the blade carriages run and the three basic types of rotors or propellers with the capability of changing the actual shape of the track upon which the blades' carriages run. The same types of mechanisms can be used for changing the blade pitch regime by means of changing either the actual shape of the track or of its projection shape upon which the blades' follower means run. Likewise optionally the same types of mechanisms may be used for changing the track shape used for determining the blade cross-sectional flexing regime, if the same is used or for turning the turnable trailing edge flap if it is present. It should be noted that certain known means for the flexible objects' shape changing such as for example those used in robotic snake arms, robotic snakes and certain surgical implements which can controllably change shape and move in at least 2 dimensions inside the body can also be used for the purpose of changing the actual tracks' or vanes shape. The first embodiment (FIG. 1P) will have a fixed shape elliptical track (1p) turnably mounted at the end points (2p) of its major axis and will have a linear actuator (3p) mounted onto the propeller structure and attached to the said fixed track (1p) for turning said fixed shape track. On the rotor (4p) arms (5p) the arm carriages (6p) will run radially as the rotor rotates while the track carriages (7p) are mounted follow the elliptic track. Track carriages are attached to the vertically moveable carriages (8p) via a ball joint (9p). The design of this type in case of the marine propellers can be built to operate in the dry environment in which case the carriages 6p, 7p, 8p and the joint 9p can be equipped with the centralized lubrication system of a suitable known kind to provide the lubrication and to remove the excess heat. Alternatively for the marine propellers this design can be operated in the water medium wherein the carriages may use the water lubrication and be cooled at the same time by water. Where appropriate this design, with either carriages moving on tracks while provided with the centralized lubrication system or operating the aquaplaning upon tracks carriages in the water medium for the marine propellers, can also be used for the other variable shape tracks.

Figure 1A:
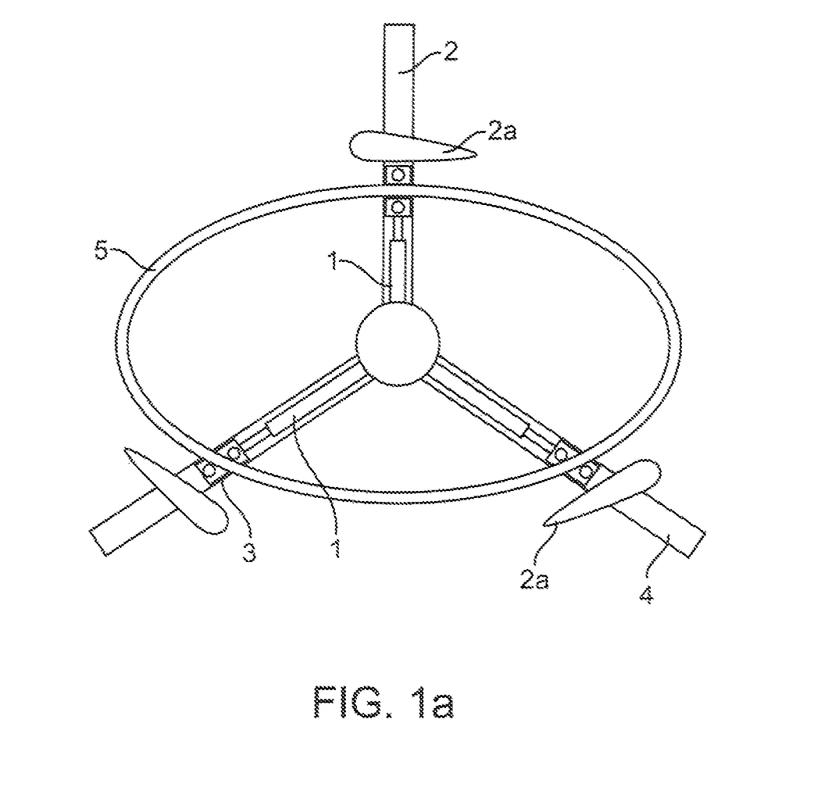
FIG. 1A is a schematic representation of one embodiment of the cycloidal rotor of the present invention equipped with the radial linear actuators and the flexible tracks containing a layer of electro-rheological fluid between the surfaces in the pivot connections.
Figure 2:
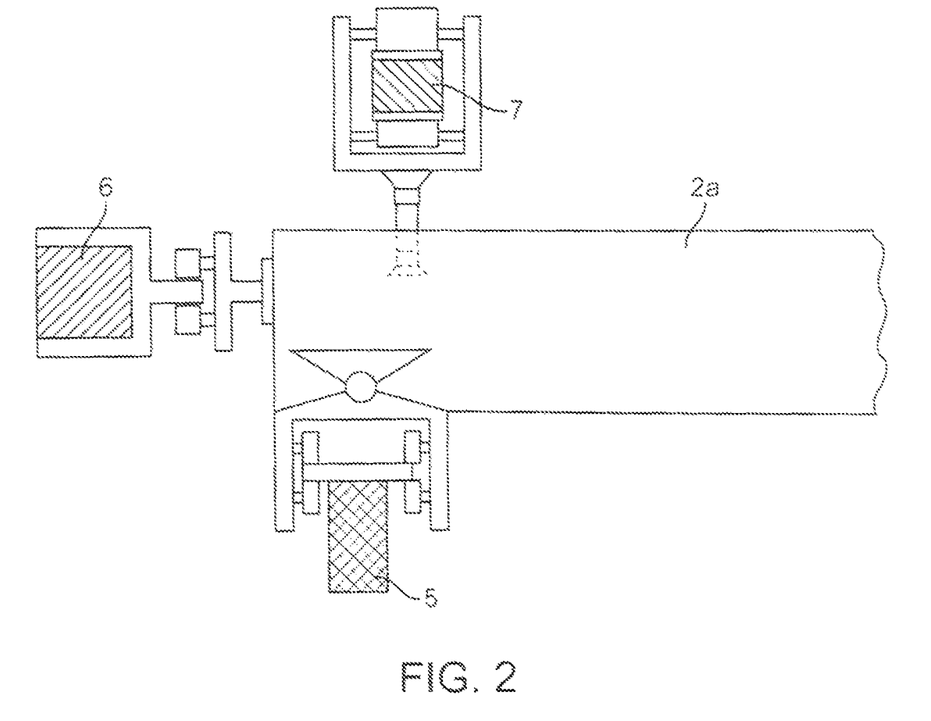
FIG. 2 is a simplified schematic frontal representation of the rotor of the present invention equipped with the variable shape track for controlling the trajectory of the blades, another variable shape track for controlling the blade pitch varying and another variable shape track for controlling the blade cross-sectional flexing regime.
Figure 2B:
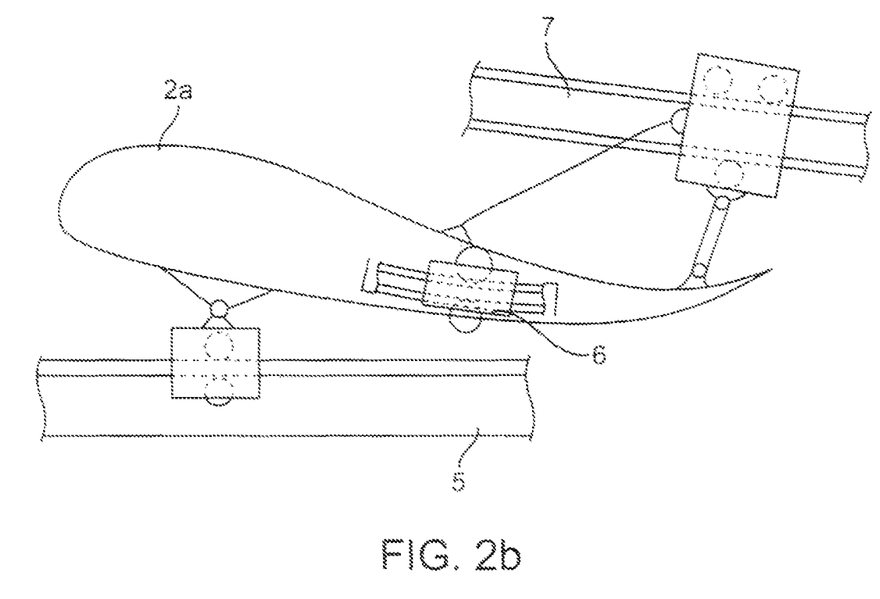
FIG. 2B is simplified schematic side view of the rotor of the present invention shown on FIG. 2.
Figure 3A:
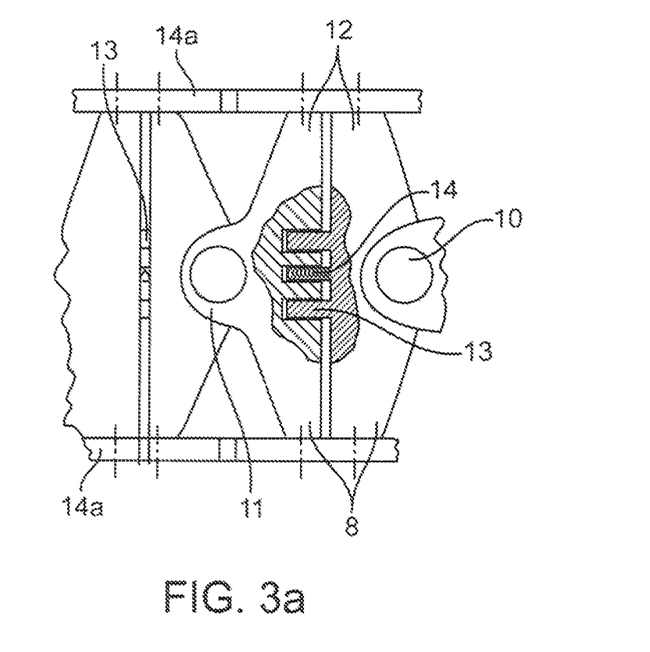
FIG. 3A is a partial view of the flexing track comprising another embodiment of the cycloidal rotor of the present invention, with said flexing track having expanding/contracting elements mounted on the segments of said track, allowing by means of proper sequential activation of said elements for the track to flex into the currently needed shape corresponding to the desired blade orbit shape.

One type of the above referenced shape changing tracks will include an elastically flexible track with connected to it linear or other types of actuators mounted on the rotor's fixed structure, with said actuators connection points placed at predetermined distances from each other on said track in order to be able to flex the track into a desired shape which corresponds to the desired orbit shape. However our preferred embodiment of this type—with the external actuators shaping the blade track, is described as follows:

Second embodiment (FIG. 1) has linear actuators (1) installed along each of the rotor's arms (2) and said actuators are equipped with known locking means (not shown) for connecting when needed to the blade carriages (3), mounted on the rotor arm's radial track (4), upon which the blade carriages are mounted while each blade carriage is also mounted for running (FIG. 2B) upon one flexible track (5) provided for the trajectory positioning of the blade. Likewise the blades (FIG. 2) may also optionally have the carriages for following the track(s) (6) designated for varying the blade pitch and/or flexing the blades cross-sectionally (7). Said tracks of this embodiment (FIG. 3A) consist of segments (8) joined by pivoted connections (9) with said pivoted connections containing a thin layer of the electro-rheological fluid (hereinafter ERF) between the shaft (10) and the brackets (11) comprising the said pivoted connection. The said segments (8) consist of two parts (12) joined by the shafts (13) and attracted to each other by an extension spring (14) which is attached to both parts (12) of the segment. The expandable covers (14a) on which the follower means are to run are mounted on top and bottom of the track assembly. The shafts (13) are inserted into the orifices of the opposing half of the segment and there is a thin layer of the ERF between said shafts and said orifices' walls. The surfaces where the ERF is applied may be knurled or otherwise roughened to increase the adhesion when the voltage is applied and the ERF solidifies. Furthermore for the above referenced areas where the ERF is placed, it is applied onto electrically conductive surfaces such as coating or the electrically conducting material such as a metal sheeting or shell which are placed upon the electrically insulating underlayment such as for example a coating or a known insulating material.

Figure 3B:
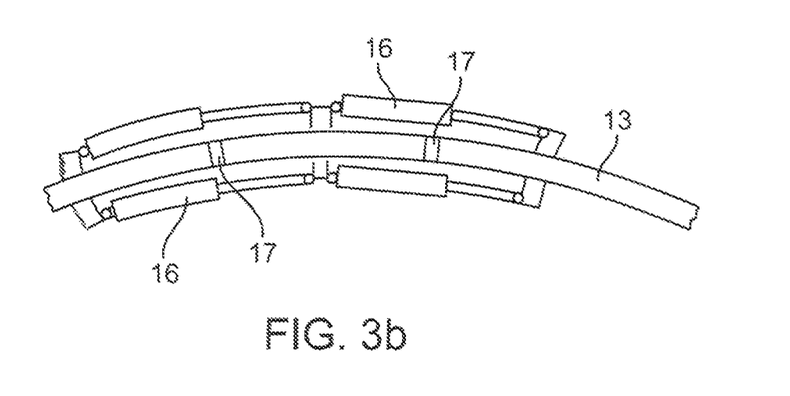
FIG. 3B is a sectional view of the flexing track of another embodiment of the cycloidal rotor of the present invention with the said track having actuators for changing the length of the portions of the said track and for also flexing said portions, allowing by means of proper sequential activation of said actuators for the track to flex into the currently needed shape corresponding to the desired blade orbit shape.

The third general type of these tracks has internal means for varying the track shapes such as for example the turn actuator built into the hinges connecting the segments where the shaft of said actuator is non-turnably connected to one segment whereas the housing of said actuator is mounted on the adjacent segment. The preferred embodiment of this type (FIG. 3B) will comprise an elastic flat core (15) made for example of the spring steel or for the light applications made for example of the known types of plastic used for the plastic springs. The flat core (15) there will be on both surfaces the raised attachment bars located at the pre-determined distances between them for the linear actuators (16) located between said bars and connected thereto in a manner enabling them when activated to exert a force on both of each actuator's attachment bars. For the purposes of varying the length of the track to be able for it to form the various required geometric shapes required, there will be at the pre-determined distances from each other, joins (17) consisting of the male and female connector forks (18) with a locking mechanism of a known type.

Alternatively the joins can be located in areas outside the span of the flexing actuators and be made movable by the dedicated linear actuators extending or contracting the join's operating length as needed. If the said join actuator is not equipped with the built-in locking mechanism to keep its moving shaft in place once its desired location has been reached then a known locking mechanism will need to be provided for the join to prevent its unintended expansion or contraction. Said joins can also be implemented as passive with the spring or other suitable elastic element urging the fork connectors towards each other and a locking mechanism of a known type for locking the connector forks into position once the desired track shape has been reached either for the whole track or for a given portion of the track.

Figure 3C:
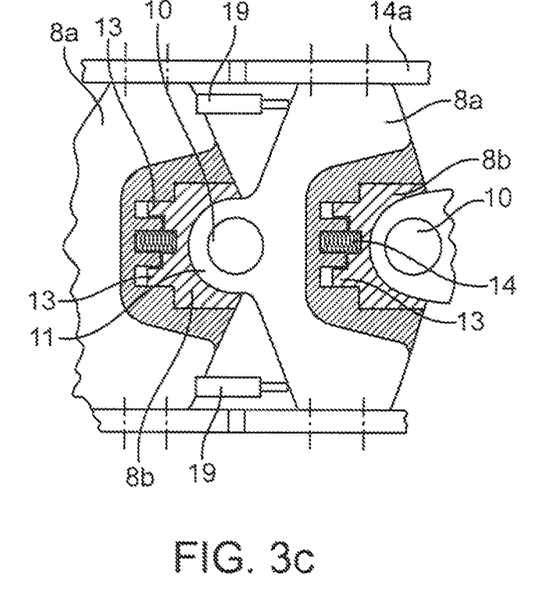
FIG. 3C is a version of the flexing track using moveable across the track wedges.

A different (FIG. 3C) approach to the design will comprise the segments consisting of two parts each (8a) and (8b) with a pivoted connection between the segments and a retractable connection between these two parts of each segment mounted on two shafts with a spring similar to the way that kind of a connection was implemented in the second embodiment. On both sides of the pivot there will be mounted the linear actuators (19) which will be miniature where appropriate. Instead of the actuators other means for varying the distance between the two adjacent segments and their relative spatial orientation (FIG. 3D) such as for example wedges (20) which will be moved by the actuators (21) and connected by a link rod (22) with a locking mechanism on one of the wedges (not shown) in case one of the actuators fails and then the said locking mechanism will be on and thus the remaining actuator would be able to move both for a period of time, thereby providing the redundancy of operation. Instead of said wedges the size varying, inflatable by oil or air under pressure inserts could be used.

Figure 4:
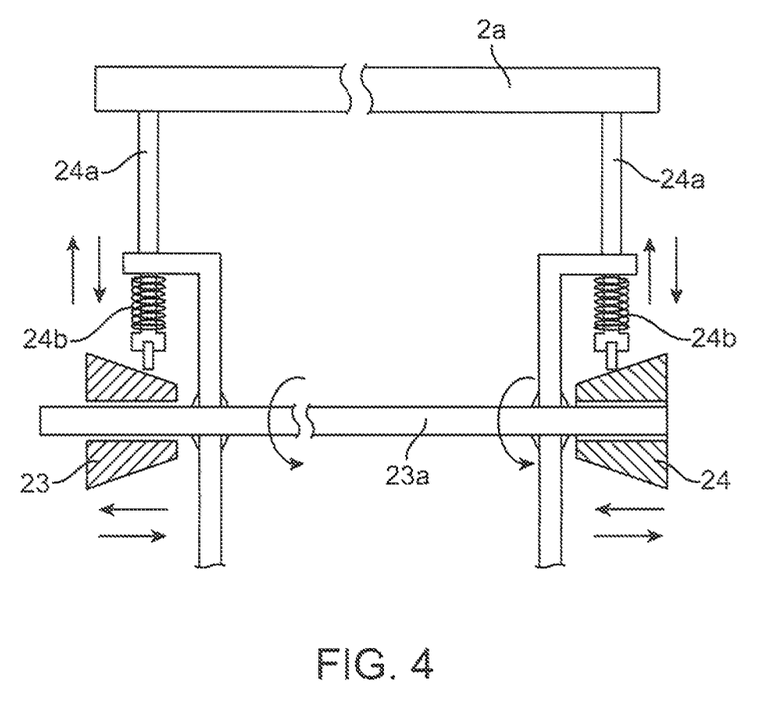
FIG. 4 illustrates another embodiment of an adjustable cam mechanism for providing a selection of the various non-circular orbits for the blades or to be used to provide a selection of the various blade pitch regimes; using the axially moveable camshaft with varying cross-section shape along its length about which run the rollers operatively connected to the blades moving radially on rotor's arms as the rotor rotates.

For the fourth embodiment of this invention as illustrated in FIG. 4, the cycloidal rotor may comprise one or more camshafts (23) disposed along the horizontal axis thereof, configured to define the path which the airfoils (2a) travel about the rotor's axis.

The camshafts 23, 24 are configured to maintain their rotational positions while the shaft 23a rotates.

Different areas along the length of each camshaft 23 or 24 have perimeters of different shapes. For example, one area of the camshaft 23 may have a perimeter shaped as a horizontally disposed ellipse or oval. A second area of the camshaft 23 may have a perimeter shaped as a circle. A third area of the camshaft 23 may have a perimeter shaped as a vertically disposed ellipse or oval. It will be appreciated that the camshaft 23 or 24 may comprise areas of its perimeter having any suitable shape with transitional areas in between.

As shown on FIG. 4, the cycloidal rotor comprises one or more rigid supports 24a associated with each of the airfoils 2a. Each of the rigid supports 24a is attached at a first end thereof to its respective airfoil 2a, and bears against the camshaft 23 or 24 at a second end thereof. The rigid supports 24a are designed to have a fixed length and to follow the path defined by the circumference of the said camshafts, for example by being biased theretoward by means of a compression spring (24b). In order to facilitate this, the said second end thereof may be provided with a roller, or any other suitable mechanism. As the roller will need to travel along the perimeter of the camshaft while said camshaft moves axially it would be preferable to make it turnable to be able to align with the resulting vector of its movement relative to the camshaft. According to some examples, two camshafts 23 and 24 are provided, each located at a location along the axis corresponding to the ends of the airfoils 2a. According to some modification, the camshafts 23 and 24 are designed to move independently of one another, thereby allowing for opposite ends of the airfoils to follow the same or different paths as one another. According to other modifications, the camshafts 23 and 24 are designed to move in tandem with one another, thereby facilitating predetermined combinations of paths for the opposite ends of the airfoils to follow. According to this modification, the camshafts 23 and 24 may have co-designed sets of paths for the two ends of the airfoils, some of which may be the same, and some of which may be different.

The fifth embodiment is for the aerial rotors whose rotational speeds are vastly higher than those of the marine propellers and the centrifugal forces can cause blade flexing and failure. This embodiment can be essentially similar to the above embodiments, but will have the means for providing the countervailing force to counteract the effects of the centrifugal force acting on the blade, which may cause the blade to bend spanwise, outward of the trajectory. First version of this embodiment (FIG. 5) to implement this neutralization of the effects of the centrifugal force provides mechanical link(s) from the blade (25) to the central shaft (26) either at one location along the blade span, such as for example generally in the middle of the blade span or a plurality of such links located along the span for the longer blades. Such mechanical links whose purpose is to prevent the outward bending of the blades are made flexible such as a belt (27) or a suitable string and are made of variable length. Said belt(s) or a string(s) are spooled on reels (27a) with wind up spring (not shown) providing the length variability and increased tension with the increase in radius and therefore centrifugal force. The second version of this embodiment (not shown) is implemented with the use of the rack (or toothed belt) and pinion mechanism on each rotor arm for each blade, wherein the rack or a toothed belt moves along the rotor arm together with the blade, while the pinion is in mesh with the rack or belt and is mounted on a positioning shaft (possibly made of carbon fiber or a similar material) with said positioning shaft for each blade mounted on and along the main rotor shaft, preferably on vibration absorbing mounts. The pinion will preferably be of a known split pinion type suited for working with the reciprocal motion. Third version of this embodiment is comprised of contact strips providing the contact surfaces located on the blades and the support curves, that are of flexing shape matching that of the track, mounted on struts with dynamically adjustable positioning by linear actuators, mounted on the stationary rotor structure extensions along the parts of the trajectory where the centrifugal force needs to be countered, such as for example the extremities of the elliptic orbit. The air lubrication is provided between the contact surfaces of the blade and the support curves. Said air lubrication can be passive, of the kind found in the air-lubricated bearings or the forced air inflow is directed into the clearance between the support curves and the contact strips via the perforation openings in the support curves' surfaces or via the porous material comprising the surface of said curves. The fourth version of this embodiment (FIG. 5A) will have light weight wire coils (26m) such as made for example of carbon nanotube wires, placed on the surface of each blade where the countervailing force needs to be provided to neutralize the effect of the centrifugal force. Similarly to the preceding version of this embodiment the stationary rotor structure extension will be used to mount a strut with adjustable positioning (27m) as described for the previous version to support a compact magnet (28m) either electric or a permanent magnets assembled into a Halbach array or a high temperature superconductivity electric magnet. The magnet mounting may be elastically pivoted or elastically supported to allow the magnet to turn, in effect following the blade when a repulsive force acts between the coils on the blade and the magnet. There is a fourth version of this embodiment comprising rollers mounted on the blade in place(s) along the span where such support is needed and the stationary railing attached to the rotor structure in a manner allowing its dynamic position adjustability as described for the preceding versions of this embodiment along the parts of the trajectory where the centrifugal force neutralization is desirable. The sixth embodiment of this invention is for the aerial rotors and especially for the aerial rotors with elongated blade trajectory. As is well known cycloidal aerial rotor's operation can be disrupted by the gusts of wind. Furthermore cycloidal rotors with horizontally elongated blade trajectory will be especially adversely affected by the horizontal oncoming relative flow which will disrupt the complex flow patterns that otherwise would exist inside of such rotor and will cause highly unstable and largely chaotic flow patterns inside of such rotor drastically reducing its Power Loading and being conducive to destabilizing the rotorcraft. In order to prevent the diminishment of Lift and/or rotorcraft destabilization the rotor (FIG. 6) is shielded by a fairing (28) from the oncoming flow while the adjustable air inlet (29) directs the flow to the rotor from above and may have optional vanes (30) to assure the proper and orderly flow distribution across the intake cross-section. Fairings (28a) can optionally be provided to guide the flow past the air intake inlet. The fairings (28) can shield more than one rotor located sequentially and generally in line horizontally. Optionally the rotor can be enclosed completely with openings at the top for air intake and at the bottom for the downwash air exit; the enclosure walls will be at a distance from moving blades so as not to affect adversely the rotor operation. This rotor will provide Lift whereas to generate Thrust the downwash flow may be directed partly towards the rear by optionally turnable and/or shape adjustable vanes (31). Such vanes can also be installed inside of the rotor especially if the blades are supported by only one strut/support in the middle or they are mounted on a shaft which is coaxial with central shaft and kept generally stationary in place between the rotating rotor arms that way, which is a well-known design—the purpose of these vanes is to manage and to optimize the internal flows, but they can also be made airfoil shaped or hydrofoil shaped for the rotors or propellers to produce respectively useful lift or thrust. Vanes turning and/or spatial position adjustment can be provided by suitable turn or linear actuators similarly to the way it is described for the blades in U.S. Pat. No. 8,540,485 or other known means, while their shape changing can be accomplished by the same means as for the flexing tracks described above for preceding embodiments or other known means such as for example those employed in robotic snake arms, robotic snakes and flexing inside the body surgical implements. Another way of providing forward thrust (FIG. 6A) is to incline the elongated trajectory forward while it is being shielded from the oncoming flow; which can be accomplished by inclining forward the positioning and other tracks; namely blade pitch and cross-sectional shape controlling tracks. Fairing (FIG. 6B, 28b) can be made fully openable which would be useful for using rotor autorotation and/or it can be provided with openable by suitable actuators (not shown) covers (28d and 28c) for exposing to oncoming flow respectively the upper and/or lower branches of blade orbits when that is advantageous for given operating conditions. Optionally the on/off openings in the rotor shielding or enclosure can be more specifically located in order to provide an incoming flow stream at a location where that would make the flow patterns inside the rotor more advantageous for rotor performance Clearly there may be many design solutions for shielding or enclosing the rotors from the oncoming flow and mutatis mutandis, they are all considered to be within the scope and spirit of this invention. Optionally the forward thrust for this configuration can be provided by a dedicated push or pull rotor/propeller or a suitable jet engine for high speed VTOL aircraft equipped with the these rotors.

Figure 7:
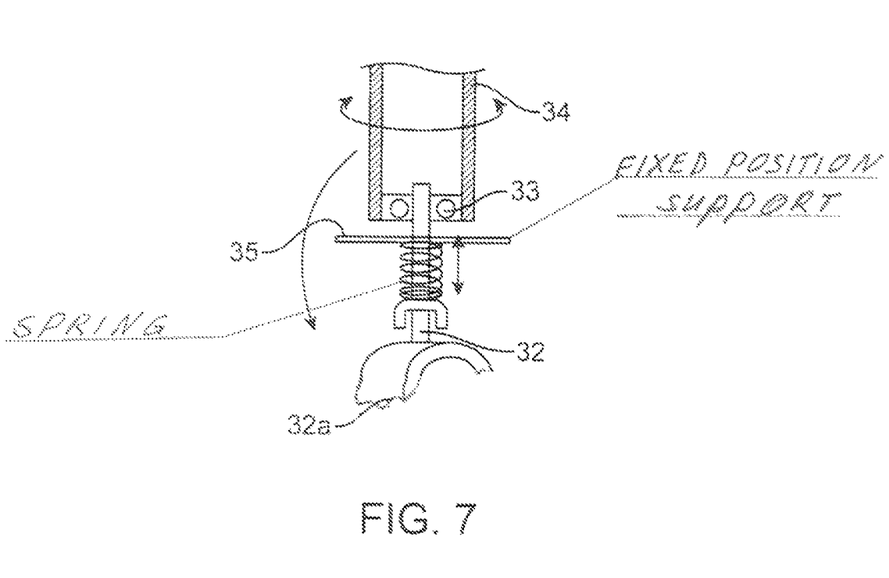
FIG. 7 shows a ball nut using, turnable variable length operative connection between the pitch track and the blade for varying blade's pitch as it travels along a non-circular trajectory.
Figure 8:
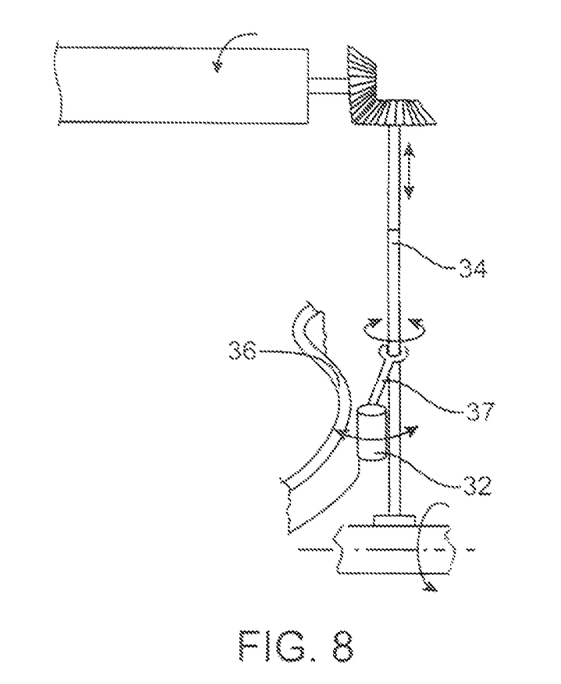
FIG. 8 shows turnable, variable length operative connection between the follower of pitch track flexing out of its plane and the blade for varying blade's pitch as it travels along a non-circular trajectory.

In the seventh embodiment the design solutions for using smaller and lighter blade pitch and blade shape flexing tracks not running alongside the blade positioning track are presented. Since the blades trajectory and therefore distance from said pitch tracks may vary, the solution can be provided by converting pitch track shape variability, as encountered by the orbiting follower means (32), into turning motion of the connecting rods; which turn by means of bevel gears the blades, thus changing their pitch. Such connecting rods can be made by known means telescoping or the bevel gear in mesh with the bevel gear of the blade is placed on a carriage moving along the turnable connecting rod, to accommodate the variability of distance between the blades and said pitch track due to blade trajectory being generally non-circular and variable. According to the first version of this embodiment (FIG. 7) the changes in the pitch track shape (32a) as encountered by follower means can be converted into turn motion by means of using high pitch threaded ball nut (33) on the connecting rod (34), so that the radial reciprocal motion of a threaded rod (35) mounted on the follower is converted into the turning motion of the connecting rod. The bevel gear or gear sector of the blade in mesh with bevel gear of the connecting rod can optionally be replaced by a coupling of worm shaft mounted on the connecting rod and a worm gear or gear sector in mesh with it which is mounted on the blade axle. Alternatively design with follower arm mounted on turnable shaft, the other end of which has a bevel gear in mesh with a bevel gear of the connecting rod. Still another different design solution features rack and pinion coupling converting the radial reciprocal motion of follower rod into turning motion which then by using bevel gears on the connecting rod is used to turn the blade, thus changing its pitch. Another possibility—pitch track changing shape outside of its plane (FIG. 8, 36) with each follower mounted on an arm (37) installed on the telescoping rod turning said rod as it follows the pitch track. The designs for blades' cross-sectional flexing can be implemented in similar ways using turnable connecting rod, except instead of turning the blade it will be subjected to linear force(s) and accordingly the turning motion of the connecting rod will be converted into a reciprocal motion by using known mechanisms, miniature where appropriate, such as crank-shaft mechanism or rack and pinion mechanism etc. Clearly there can be many ways of implementing this conversion of track shape variability as encountered by the follower into a turning motion, which is then transmitted to the blade to vary its pitch or to flex it cross-sectionally and *mutatis mutandis* they are all considered to be within the scope and spirit of this invention.

It should be noted, that especially for the embodiments with flexing tracks, that it may be advantageous to use the blade pitch and trajectory positioning tracks interchangeably for changing the blade pitch, for the purposes of alternating the effective pivot points and/or moving the virtual pivot point along the chord when needed. For example if, as the blade travels and while one track as encountered by the blade does not materially change direction while the other track does; the rollers of the former track would become the pivot point for that moment. If both tracks change directions as encountered by the traveling blade, but by different extents the virtual pivot will form at a corresponding to such relative displacements location along the chord. For this kind of tracks arrangement, which would allow the use of blade pronation and supination to the fuller extent and the pivot point shift at the trajectory points where this would be useful, it would be desirable to locate the rollers or other follower means further apart along the chord. Of course this kind of operation may involve the movement of the blade's cross-sectional center of mass which the control system would need to take into account for the determination of the counterweights radial positioning and/or trajectory.

According to any of the above, the cycloidal rotor of this invention may further comprise a controller (not illustrated) to direct operation of the various elements thereof.

Those skilled in the art to which this invention pertains will readily appreciate that numerous changes, variations and modifications can be made without departing from the scope of the invention mutatis mutandis.

Sketches and Diagrams

Provided Separately

Operation

Figure 1P:
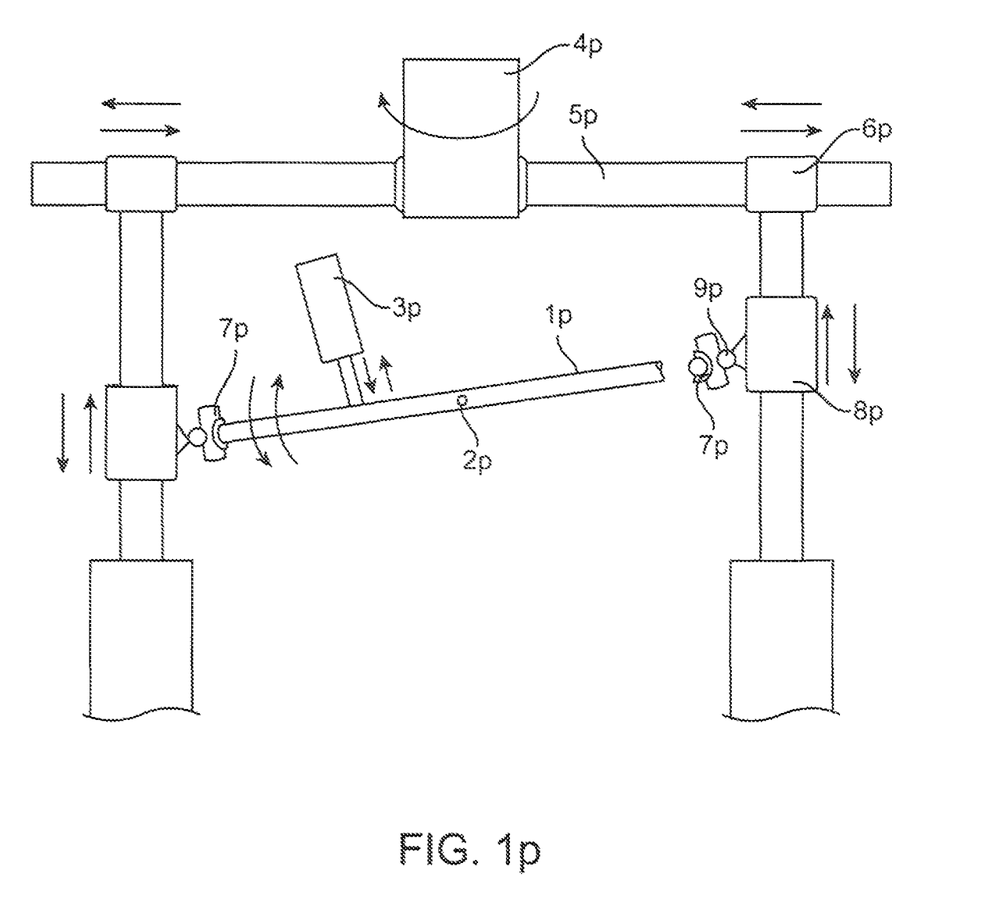
FIG. 1P is a schematic representation of one embodiment of the cycloidal propeller of the present invention equipped with an elliptical track of fixed shape that is turnable around its major axis by a predetermined degree in order to be able to produce the projection of said track onto the operating plane, which is what determines the actual blade trajectory, that will generally be an ellipse of a different ratio between its two major axis and thus shape than the said fixed elliptical track.

In operation the first embodiment with a fixed turnable track will work as follows. On the rotor (4p) arms (5p) the arm carriages (6p) will run radially as the rotor (4p) rotates while the track carriages (7p) will be following the elliptic track (1p). When the linear actuator (3p) moves it turns the fixed elliptic track (1p) and said track's projection onto the horizontal plane determining the blades trajectory will change to that of a different elliptical shape with the same major axis length, but a different minor axis length thereby changing the blade trajectory's aerodynamic or hydrodynamic characteristics respectively to adjust to changes in the operating regime. If the design of this type in case of the marine propellers is built to operate in the dry environment, the carriages 6p, 7p, 8p and the joint 9p are to be irrigated with a lubricant by the centralized lubrication system thereby providing the lubrication and the removal of the excess heat. Alternatively for the marine propellers the design of this type can be built for the operation in the water medium wherein the carriages may use the water lubrication, such as for example for aquaplaning, and be cooled at the same time by the water.

Second embodiment (FIG. 1) during rotor's transitional phase of operation has computer controlled actuators to dynamically vary blades' radial positions and thus their trajectory, while each blade also runs on and flexes the track (5) containing the ERF fluid around the pivot joint shafts (10) and the extension shafts (13) which, once desired orbital trajectory and corresponding track shape are reached and voltage is applied by the control system, almost instantly solidifies and the actuators (1) disengage and retract to their base positions until the orbit has to change again. Likewise (FIG. 2) when the track (6) of the first embodiment is used for the blade pitch change such pitch change is performed by the actuators (not shown) while in the manner described above the blade pitch track (6) with the ERF containing pivots between its segments is flexed. Once the desired blade pitch track shape has been reached, the voltage is applied by the control system, the said track almost instantly solidifies and the actuators disengage.

For the third embodiment in the first version of said embodiment (FIG. 3B) the dedicated actuators effect the relative movement of the connector forks (18) thereby varying the length of the track while the flexing linear actuators (16) flex the flat core's (15) span between their attachment points with said length's variability and span flexing amounts and time sequence of the changes determined by the control system in order to achieve the required track shape and therefore depending on said track's purpose either the required blade trajectory or the required blade pitch regime or the blade flexing regime or the trailing edge turning regime. Likewise for the second version of the second embodiment (FIG. 3D) the linear actuator's first changes the operating length of the connector joins and then on command of the control system the connector join is locked, whereupon the actuators expand or contract in order to effect the flexing of the span of the flat core (15) inside their respective spans and thereby accomplish the overall change of the track's shape required by the control system to achieve its functional objectives as has been described above for the first version of this embodiment. For the second embodiment the distance-varying means between the segments accomplish two objectives; by means of their differential activation the relative spatial positioning of the each two adjacent segments changes is controlled by the control system, whereas the said distance-varying means' combined expansion or retraction produces the track lengthening or shortening in conjunction with said relative spatial positioning of the segments' changes producing the required new shape of the track. The distance varying means presented above in the Description section included the actuators, the wedge shaped elements which move generally across the span of track changing the distance between the contact surfaces of the adjacent segments and can be used to change the distance between the segments, the inflatable elements whose action is similar to that of the actuators (19) between the segments.

For the fourth embodiment in operation, in order to change the shape of path of the airfoils 2a about the rotor axis, camshafts 23 and 24 are moved longitudinally along the axis, so as to change the shape of perimeter which is in contact with the rollers mounted on the rigid supports 24a. By selecting the area of each camshafts 23 and 24 which are in contact with said rollers, the shape of the path of the airfoils 2a about the rotor axis can be controlled. In order to facilitate longitudinal movement of the camshafts 23 and 24, a linear actuator (not shown), or any other suitable mechanism, may be provided.

Figure 5:
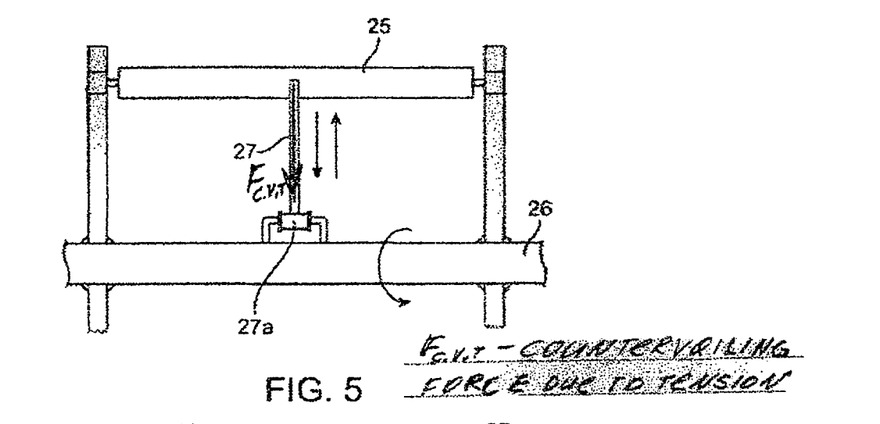
FIG. 5 shows mechanism for neutralizing the effect of centrifugal force on rotor blades.
Figure 5A:
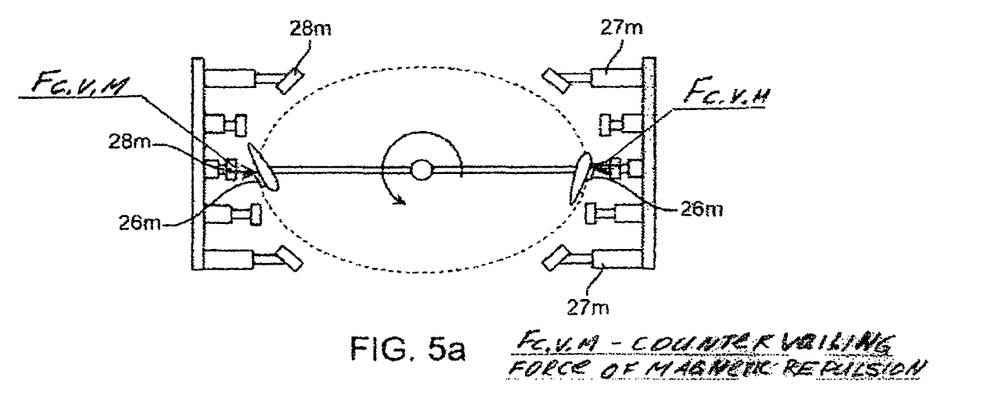
FIG. 5A shows rotor with electromagnetic blade span support
Figure 5B:
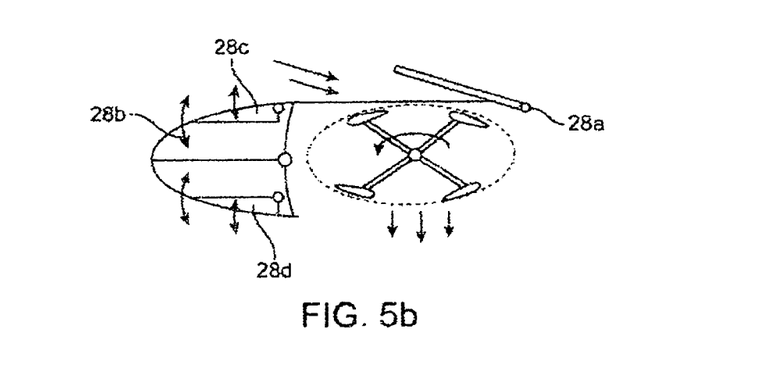
FIG. 5B is the side view of a rotor with fully openable fairing in front of it

For the fifth embodiment in the first version the movement of the blade carriage will be transformed by the rack/pinon pair into the turning of the positioning shaft which will cause either unwinding or winding of the belt/string from or respectively onto the reel thus assuring that the length of said belt/string always corresponds exactly to the radial position of the blade thus preventing the blade's bending outward due to the centrifugal force. For the second version the air lubricated riding of the blade's contact strip upon the support curve will accomplish the prevention of the blade's outward bending. For the third version the magnet will induce in the coils upon the approaching blade the currents which in turn will produce a magnetic field interacting repulsively with the magnet's magnetic field. Furthermore the magnet will, depending on its support structure type, either pivot or recline in effect accompanying the blade and continuing to act repulsively on the coils and thus the blade upon which they are located thereby preventing its bending outward and negating the effect of the centrifugal force. For the fourth version the rollers on the blade will ride upon the railings present at the parts of the trajectory where the centrifugal force is the greatest, thereby preventing the blade's bending outward and negating the effect of the centrifugal force.

Figure 6:
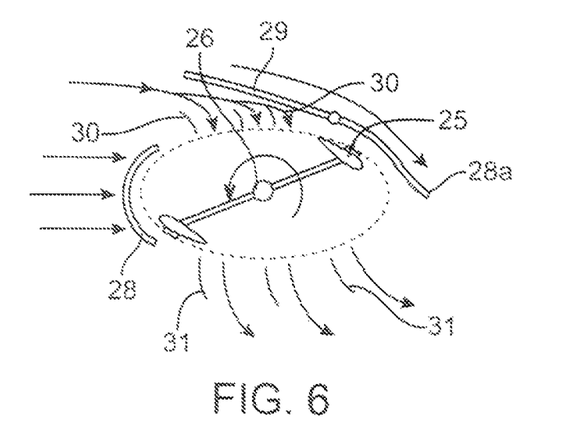
FIG. 6 shows the rotor with fairings and vanes.
Figure 6A:
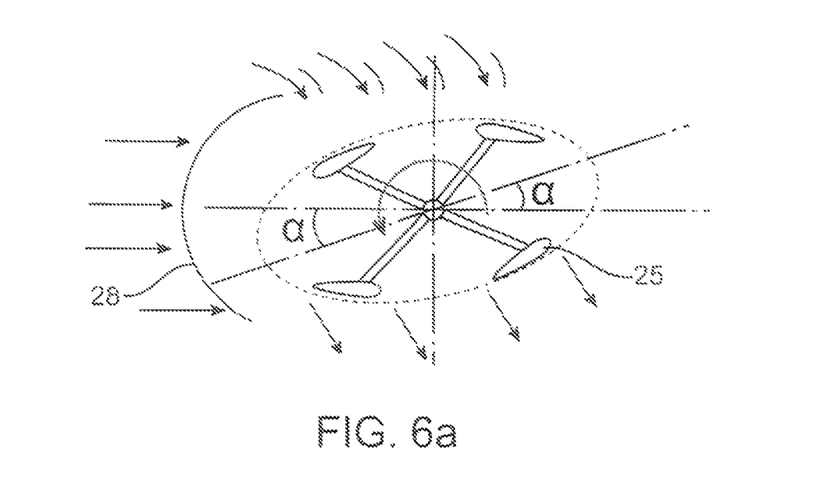
FIG. 6A shows rotor with inclined elongated trajectory.

For the sixth embodiment front fairing or rotor enclosure will prevent the disruptive effects of gusts of wind and/or oncoming flow thereby assuring that the lift generation is not decreased and the destabilization of rotorcraft is prevented. It should be noted that a rotor of this embodiment is to operate largely as if it is in hovering flight and a key cycloidal rotor parameter—advance ratio, is not applicable. Furthermore its blades will not circumscribe an infinite cycloid curve relative to oncoming air, but rather will generally follow a closed loop orbit of whatever shape orbit is being used. The intake vanes, operated by control system or operator, will assure that the intake flow is appropriately uniform and orderly, whereas the outflow vanes are to be used for generating forward thrust or turning. The inside rotor vanes will help control and optimise the flows inside rotor and if they are shaped as airfoils/hydrofoils can be used to generate respectively Lift or Thrust.

The operation of the rotor of seventh embodiment has been adequately described in the Description section and will not be reiterated here, but is included by way of reference as if fully set forth.

In conclusion it needs to be mentioned that the cycloidal rotor or propeller of the present invention can be used for various types of applications, including, but not limited to VTOL aircraft, airships, ships propellers, various underwater vehicles' propellers, airboats, propeller snowmobiles, wind turbines etc.

What is claimed is:

1. The present invention provides a cycloidal rotor having a plurality of blades mounted to follow a generally non-circular track; said track changing means operative to transition between a plurality of track shapes; blade pitch adjusting means for adjusting the blade angle-of-attack, blade dynamic counterbalancing means to assure that the rotor remains balanced and drive means for propelling the blades along said track.

2. The rotor of claim 1, wherein said generally non-circular track is flexible and said changing means comprise actuator means for flexing said track until it reaches the shape corresponding to the desired orbit of the blades.

3. The rotor of claim 2, wherein said actuator means are linear actuators for positioning the said flexible track radially with respect to an axis of rotation of the rotor.

4. The rotor of claim 2, wherein said flexible track contains smart material which solidifies when controlling means are applied making said track rigid.

5. The rotor of claim 1, wherein said track is flexible and said changing means comprise track inherent flexing means.

6. The rotor of claim 1 wherein said track inherent flexing means comprise pertinent dimension varying parts of the track.

7. The rotor of claim 1, wherein said track inherent flexing means comprise track parts relative to each other angular position changing means.

8. The rotor of Claim I wherein the said plurality of track shapes is located in a track shapes assortment means.

9. The rotor of claim 8 wherein said track shapes assortment means is a variable cam mechanism.

10. The rotor of claim 9, wherein said variable cam mechanism comprises a variety of cam track shapes located along a camshaft about which run the follower means operatively connected to the blades.

11. The rotor of claim 10 wherein said camshaft's relative position to said follower means is changeable by positioning means operative to change said relative position until a track shape corresponding to the desired orbit shape is reached.

12. The rotor of claim 11 wherein said follower means comprise pads operatively connected to the blades and supported above the surface of said track by a layer of air forced into the clearance between the surface of the track and the pad and the positioning means are linear actuators.

13. The rotor of claim 11 wherein said camshaft surface is continuous along its operational length and said follower means comprise rollers operatively connected to the blades, with said rollers being turnable in the direction of the vector of their relative movement with respect to said camshaft in order to accommodate said camshaft's movement along its axis, while running about it.

14. The rotor of claim 1 comprising carriages mounted on a track and operatively connected to the blades shafts wherein said track can be inclined about its major axis thereby changing its shape projection onto the plane in which blades travel thus changing the shape of their orbit.

15. The rotor of claim 1 further comprising the shielding means to prevent oncoming airflow from reaching the inside of the rotor.

16. The rotor of claim 15 wherein said shielding means further comprise the means for limited and specifically localized oncoming flow admission when that improves rotor performance.

17. The rotor of claim 15 where said shielding means are rotor's enclosure with opening at the top for air intake and opening at the bottom for downwash exit.

18. The rotor of claim 1 further comprising vane means to control the airflow about the rotor.

19. The rotor of claim 1 further comprising the blade's centrifugal force countervailing means.

20. A method for generating lift or propulsive force comprising:
   a) providing a cycloidal rotor with blades mounted on generally non-circular track having track shape changing means for following a corresponding non-circular blade orbit and;
   b) providing a computer control system operatively connected to said track shape changing means, for controlling the blade support means position and operatively connected to actuator means for changing the angle of attack of the blades;
   c) providing drive means for propelling the blades along said track;
   d) propelling the blades along their orbits at a speed suitable for generating lift or propulsive force; and
   e) running the computer control system to activate the actuator means to vary the blades' angle of attack in relation to the blade's position along the said track and the track shape changing means to change the track shape until the corresponding blade trajectory is optimal as determined by the said control system or the operator, and in response to control input transmitting desired operating parameters provided by input means, whereby the rotor will produce the desired operating performance in generating lift or propulsion force.

* * * * *